US012676322B2

(12) United States Patent
Stoehr et al.

(10) Patent No.: US 12,676,322 B2
(45) Date of Patent: Jul. 7, 2026

(54) PACKAGING ARRANGEMENT AND PACKAGING SYSTEM

(71) Applicant: Reinz-Dichtungs-GmbH, Neu-Ulm (DE)

(72) Inventors: Thomas Stoehr, Laupheim (DE); Rachel Brodiak, Ulm (DE); Benedicto Torrubias, Ulm (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 549 days.

(21) Appl. No.: 18/348,974

(22) Filed: Jul. 7, 2023

(65) Prior Publication Data
US 2024/0014411 A1 Jan. 11, 2024

(30) Foreign Application Priority Data
Jul. 7, 2022 (DE) ...................... 20 2022 103 814.7

(51) Int. Cl.
| | |
|---|---|
| *H01M 8/0247* | (2016.01) |
| *H01M 8/0206* | (2016.01) |
| *H01M 8/2475* | (2016.01) |

(52) U.S. Cl.
CPC ....... *H01M 8/0247* (2013.01); *H01M 8/0206* (2013.01); *H01M 8/2475* (2013.01)

(58) Field of Classification Search
None
See application file for complete search history.

(56) References Cited

U.S. PATENT DOCUMENTS

2006/0292428 A1* 12/2006 Suh ..................... H01M 8/2404
429/514

* cited by examiner

*Primary Examiner* — Carlos Barcena
(74) *Attorney, Agent, or Firm* — McCoy Russell LLP

(57) ABSTRACT

The present disclosure relates to a packaging arrangement comprising a base plate, at least one first bolt secured to the base plate and a multiplicity of separator plates for an electrochemical system, which are stacked on the base plate in a stacking direction so as to form a separator plate stack, wherein the first bolt is received in first cut-outs of the stacked separator plates, said first cut-outs being aligned in the stacking direction. The present disclosure further relates to a packaging system including a light-load carrier and two of the aforementioned packaging arrangements, and to a method for packaging separator plates for an electrochemical system.

20 Claims, 12 Drawing Sheets

PACKAGING ARRANGEMENT AND PACKAGING SYSTEM

CROSS-REFERENCE TO RELATED APPLICATION

The present disclosure claims priority to German Utility Model Application 20 2022 103 814.7, entitled "PACKAGING ARRANGEMENT AND PACKAGING SYSTEM", and filed Jul. 7, 2022. The entire contents of the above-listed application is hereby incorporated by reference for all purposes.

TECHNICAL FIELD

The present disclosure relates to a packaging arrangement and to a packaging system comprising at least two corresponding packaging arrangements.

BACKGROUND AND SUMMARY

The packaging arrangement is suitable for packaging a multiplicity of separator plates for an electrochemical system, for example for fuel cells, electrolysers, electrochemical compressors, redox flow batteries and humidifiers of electrochemical systems.

Typically, separator plates are stacked on a twin-wall plate and capped with a twin-wall plate. The separator plate stack is secured and transported in small-load carriers (KLT) lined with twin-wall plates.

The risk here is that the separator plates are damaged. In addition, the process in this form cannot be automated. Often, using standard twin-wall plates also requires additional padding material so that the stack of separator plates cannot slip, and thus be damaged, in the standardised KLTs. In most cases, the twin-wall plates are not re-used since they are often contaminated unless further measures are taken. Thus, a considerable amount of waste is generated in current packaging systems.

Against this background, the object of the present disclosure is to address at least one of these problems and propose an improved packaging arrangement and/or an improved packaging system. In addition, an improved method for packaging separator plates for an electrochemical system will be described.

At least one of these objects is achieved by a packaging arrangement according to the present disclosure.

The packaging arrangement proposed in the present case comprises a base plate, at least one first bolt secured on the base plate and a multiplicity of separator plates for an electrochemical system, for example for a fuel cell, for an electrolyser, for an electrochemical compressor, for a redox flow battery or for a humidifier of an electrochemical system. The multiplicity of separator plates are stacked on the base plate in a stacking direction so as to form a separator plate stack. The first bolt is received in first cut-outs of the stacked separator plates, said first cut-outs being aligned in the stacking direction.

Separation elements can be arranged between the separator plates in the stacking direction. For example, a separation element in the form of a separation paper can be arranged between each two separator plates stacked one on top of the other. The separation elements can prevent the stacked separator plates sticking to one another, for example can prevent seals arranged on the separator plates from sticking to one another, and/or prevent damage owing to friction between the separator plates, or at least reduce the occurrence thereof. The separation elements can, for example, be made of or comprise parchment paper. Additionally or alternatively, the separation elements can comprise polymer-based films, e.g. polyester films, wax paper or laminated paper. The separation elements merely serve to separate the separator plates. Membrane electrode assemblies or other elements arranged between the separator plates in a functional fuel cell stack or other functional stack of an electrochemical system should typically not be construed as separation elements.

The first bolt can fix the separator plates in position relative to the base plate in at least one direction. Additionally, at least one stop can be provided on the base plate, for example in the form of one or more ribs that extend from the base plate in the stacking direction.

In one embodiment, the packaging arrangement has at least one second bolt secured to the base plate. The second bolt can be received in second cut-outs of the stacked separator plates, said second cut-outs being aligned in the stacking direction. The second bolt can fix the separator plates in position relative to the base plate in at least one direction. The first and second bolts are typically arranged at a spacing from one another in a direction transverse to the stacking direction. The first and second cut-outs are typically arranged at a spacing from one another in a direction transverse to the stacking direction.

In one embodiment, the first bolt and the second bolt fix the separator plate stack in position relative to the base plate in a first direction perpendicular to the stacking direction and in a second direction perpendicular to the stacking direction and perpendicular to the first direction.

For example, in this way fixing can be achieved in which both translatory movements of the separator plates transversely to the stacking direction and rotation of the separator plates about a straight line running through the stacking direction are blocked.

By way of example, the stacking direction can run in a z-direction, which is perpendicular to an x-direction and perpendicular to a y-direction. The base plate can in an xy plane or in parallel therewith. The xy plane is a plane in which a straight line running in the x-direction and a straight line running in the y-direction are located. Accordingly, the first and second bolts can extend in the z-direction so that movement of the separator plates in both the x-direction and y-direction is blocked.

Fixing the separator plates in position on the base plate by means of two bolts reaching through orifices in the separator plates is advantageous, for example, in order to prevent damage to the separator plates, for example damage to outer edges of the separator plates or warping of the separator plates, during transportation.

In an exemplary embodiment, the first and/or the second bolt can be screwed to the base plate. For example, the first and/or the second bolt can have an external thread at its bottom end, and the base plate can have, on its top side, a first bore having an internal thread for receiving the first bolt and/or a second bore having an internal thread for receiving the second bolt. Each internal thread of the base plate can be formed such that it corresponds to the respective external thread of the first and/or the second bolt. To limit a length of thread engagement, the first and/or the second bolt can have a collar at the top end of the external thread, the diameter of said collar being greater than the corresponding bore in the base plate for receiving the thread of the relevant bolt. In this case, a counterbore having a greater internal diameter can be provided in the base plate, and the collar can be inserted into said counterbore so that a top side of the collar is flush with the top side of the base plate. The internal thread can be formed in the base plate itself but can also be formed as a metal insert that can in turn be fixed in position by means of a screw, screwed into the base plate by means of its own thread or, in the case of an injection-moulded plastics plate, be introduced into said plastics plate as the base plate and overmoulded with the material thereof. In principle, however, it is also possible not to provide any internal thread but merely to provide a cut-out on the underside of the base plate and to fix the free end of the bolt in position in a form-fitting manner, for example by means of a nut or by means of a screw and an internal thread on the bolt.

In possible embodiments of the packaging arrangement, more than two bolts can be provided, each received in cut-outs of the stacked separator plates, said cut-outs being aligned in the stacking direction. It may be sufficient to provide exactly two bolts in order to prevent or limit both linear and rotational movements.

In one embodiment of the packaging arrangement, the separator plates and/or the base plate have a rectangular or substantially rectangular shape, for example having rounded corners, perpendicularly to the stacking direction. In the present case, "substantially rectangular" may also include a bone shape, e.g. for example an elongate shape that has at least one, for example central or substantially central, reduced-width portion in its longitudinal direction. The bone shape may be symmetrical or substantially symmetrical along its longitudinal axis and/or width axis. Asymmetrical shapes may also be used, however, for example to automatically recognise the orientation of the base plate. For example, the base plate can have a bone shape and the separator plates can have a rectangular shape.

For example, the first cut-outs and the second cut-outs of the separator plates can be formed in diagonally opposing corner regions of the separator plates. This may be advantageous for example in order to fix the separator plate stack securely in position on the base plate. In principle, however, it is also possible to arrange the first and second cut-outs of the separator plates in corner regions adjacent to the same longitudinal edge.

In one embodiment, the packaging arrangement has a cover plate. The cover plate can have a rectangular or substantially rectangular shape. The separator plate stack can be arranged between the base plate and the cover plate in the stacking direction. The advantage of this is that the separator plate stack is better protected against damage, for example caused by mechanical influences on the separator plate stack. In addition, like the base plate, the cover plate protects the separator plate stack from dirt.

The cover plate can have a greater surface area than a surface area of each separator plate. Additionally or alternatively, the cover plate can be formed such that it protrudes beyond outer edges of the separator plate stack at least in some regions. At the same time, the projecting outer edges of the base plate and/or cover plate protect people handling the separator plate stack from being injured.

For example, corner regions of the cover plate can protrude beyond corner regions of the separator plate stack. Additionally or alternatively, corner regions of the base plate can protrude beyond corner regions of the separator plate stack. The outer edges of the separator plate stack can thus be better protected against damage, which is a significant advantage, such as in very thin metal sheets as used especially in separator plates for fuel cells.

In one embodiment, the cover plate has a first cut-out that is aligned with the first cut-outs of the separator plates in the stacking direction. For example, where two cut-outs in the separator plates and a second bolt are provided, the cover plate can have at least one second cut-out that is aligned with the second cut-outs of the separator plates in the stacking direction.

The first and/or the second cut-out of the cover plate can be formed as either through-holes or blind holes. The cut-outs of the cover plate can be the same size as or smaller than the cut-outs of the base plate.

In addition, the first bolt can be received in the first cut-out of the cover plate. Additionally, the second bolt can be received in the second cut-out of the cover plate. The advantage of this is that the first and/or the second bolt fixes the cover plate in position in relation to the base plate and the separator plate stack in at least one direction transverse to the stacking direction if at least two bolts are provided, in two mutually orthogonal directions transverse to the stacking direction.

The first bolt can be inserted into the cover plate. The first bolt can be flush with a top side of the cover plate or protrude beyond the cover plate. The second bolt can be inserted into the cover plate. The second bolt can be flush with a top side of the cover plate or protrude beyond the cover plate. On the cover plate side, the first and/or the second bolt may have a taper and/or an insertion bevel.

The base plate and/or the cover plate typically comprises plastics material, for example polypropylene, polyethylene or polyamide, for example fibre- or particle-reinforced plastics material. The base plate and/or the cover plate can comprise glass-fibre reinforced plastics and/or carbon-fibre reinforced plastics. The base plate can for example be an injection-moulded part. The cover plate can likewise be formed as an injection-moulded part, but it may also be a plate cut out from a plastics material, for example an extruded plastics material. The base plate and/or the cover plate can for example be equipped in an antistatic manner. It is also possible for parts of the base plate and/or cover plate or the entire base plate and/or the entire cover plate to be made of a metal material. Inserts, such as threaded inserts, typically comprise metal, for example aluminium and/or steel. The bolts typically comprise metal, for example aluminium and/or steel, for example stainless steel, and/or titanium; in the process, the material may be tailored to the material of the separator plates. Additionally or alternatively, the bolts can comprise plastics material.

In one embodiment, the packaging arrangement has a flexible film. The flexible film can enclose the base plate, the separator plate stack and the cover plate at least in some regions. For example, the flexible film encloses a module comprising the base plate, the separator plate stack and the cover plate, the base plate and the cover plate already being screwed together in this module by means of the aforementioned bolts, with the separator plates gripped therebetween. The flexible film may fully enclose the separator plate stack and the cover plate. The flexible film can have holes, for example perforations. The film may be advantageous for protecting the separator plate stack from dirt, dust and/or water, for example spray. The film can be watertight but may also have perforations through which for example air can pass.

For example, the flexible film can restrain the separator plate stack between the base plate and the cover plate in the stacking direction. In this way, for example, the lid can be fixed in position on the separator plate stack in the stacking direction.

By way of example, the flexible film can be formed as shrink film. Perforations in the film can be used for discharging air during a shrink-on process.

If, as mentioned above, the base plate and, where applicable, also the cover plate are configured having corner regions that jut out beyond the separator plate stack, the flexible film can be braced or shrunk on over these corner regions so that the film is not in direct contact with the edges of the separator plates and wear can thus be prevented.

A tear strip can be integrated in the flexible film for opening and/or removing the flexible film. The tear strip can be arranged around the base plate, the separator plate stack and the cover plate in an encircling manner, or only in some regions. The tear strip can make it simpler to open the film.

Alternatively or additionally, it is possible for at least one tape, for example a strapping tape, for example a non-stretch strapping tape, to restrain the separator plate stack between the base plate and the cover plate in the stacking direction. It may be sufficient to provide exactly one strapping tape in order to prevent linear and rotational movements of the separator plates or at least limit them to a permitted level. A plurality of strapping tapes, for example at least two strapping tapes, can be provided. The strapping tapes can extend at a spacing from one another and in parallel. Additionally or alternatively, two strapping tapes can cross, for example at an angle of approximately 90°. For this purpose, one strapping tape can be arranged such that it encircles two first opposite edges of the separator plate stack as well as the base plate and cover plate, whereas a second strapping tape is provided and arranged such as to encircle the base plate and the cover plate as well as two further edges of the separator plate stack that are different from the first two opposite edges.

To prevent dirt, tape bracing can be combined with the separator plate stack being wrapped in a plastics film, for example a film bag, or even combined with wrapping made of parchment packaging. This kind of wrapping can be secured by means of the at least one tape.

If a strapping tape of this kind, or for example two crossing strapping tapes, is used to brace the separator plate stack between the base plate and cover plate, it is expedient to also use these strapping tapes to grip the packaging arrangement. In this case, at least one recess can additionally be provided in the cover plate, for example in the region of the centroid of the cover plate, which recess makes it simpler to grip the tape, tapes or tape crossing point. This is an alternative or additional option to the gripping methods to be set out below.

In one embodiment, the first and/or second cut-outs of the separator plates are formed as through-holes spaced apart from edges of the separator plates. Additionally or alternatively, the first and/or second cut-outs of the separator plates can be formed as indents, e.g. notches formed inwards from the edges of the separator plates.

The separator plates can each have an active region having structures for conducting media along a planar face of the separator plate, and an integrally closed sealing arrangement, encircling the active region, for sealing the active region. The media-conducting structures can have further integrally closed sealing arrangements, at least part of which is arranged inside the aforementioned encircling sealing arrangement. In an example embodiment, a first media-conducting structure, for example in the case of separator plates for fuel cells, can have a structure for conducting a coolant. A second structure can be a structure for conducting a reaction medium, for example hydrogen. A third media-conducting structure can be a structure for conducting a further medium, for example air. Usually, structures are provided for supplying and removing each media system. The structures usually comprise at least one port opening formed as a through-opening through the separator plate. For example, the coolant-conducting structure can be arranged inside or outside the sealing arrangement enclosing the active region. Separator plates for other applications, for example in electrolysers, may have just two media systems and accordingly have at least two respective structures for supplying and removing the media. In principle, a plurality of supply and removal structures per media system are possible. The first and/or the second and/or (if present) the third structure can each comprise an encircling sealing arrangement (also referred to hereinafter as a port seal). The first cut-outs and/or the second cut-outs of the separator plates can each be arranged outside the sealing arrangement encircling the active region or outside the region encompassed thereby. The advantage of this is that damage can be prevented in the active region. Likewise, the first cut-outs and/or the second cut-outs of the separator plates can be arranged outside the port seal or the region encompassed thereby. For example, this can prevent damage to the sealing arrangements and the edges of the media-conducting structures. For example, bulges and/or recesses can be formed in the active region to form channels when the separator plates are, for example, stacked one on top of the other in a fuel cell stack together with the membrane electrode assemblies forming the actual cells and, where applicable, diffusion media. Arranging the first and, where applicable, the second orifice in this way outside the separator plate region surrounded by at least one sealing arrangement leads to the edges of the orifice being located in the fuel cell stack in regions that are covered by the reinforcement edge of the membrane electrode assembly, such that any possible warping of these edges does not lead to a short circuit owing to contact between the adjoining separator plates, since the reinforcement edge is located in this region as insulation between the separator plates.

Each sealing arrangement can comprise metal bead seals and/or elastomers.

The above-described separation elements between the separator plates of the separator plate stack can likewise counteract damage to the seals since the seals of the stacked separator plates do not stick to one another, or only do so to an insignificant extent, owing to the separation elements arranged between the separator plates.

In an advantageous embodiment, the base plate has at least one through-opening. The through-opening can be arranged such that a projection of the through-opening onto the separator plates in the stacking direction coincides with the active regions of the separator plates at least in some regions. Advantageously, the at least one through-opening is arranged such that it does not coincide with any of the aforementioned ports when projected onto the separator plates. Thus, the base plate can protect the port edges against deformation. For example, the at least one through-opening can be configured such that a lifting and lowering device can reach through the at least one through-opening in the base plate in order to lift and lower the separator plates or separator plate stack in such a way that, when the separator plates are stacked on the base plate, for example, a new separator plate to be added can always be set down at the same height relative to the base plate or, when the separator plates are taken off the stack, they can always be removed at the same height. Advantageously, the at least one through-opening is arranged substantially in the middle in relation to the area of the separator plates. In an embodiment, two through-openings are provided such that a bar therebetween stabilises the base plate. By way of example, the lifting and lowering device can have two cylinders that are extendable in the stacking direction. For example, when the separator plates are stacked, direct contact between the lowermost separator plate and the lifting and lowering device may be prevented, for example by also setting down a separation element, as otherwise inserted between the individual separator plates, on the base plate.

As regards the ratio of the at least one through-opening, for example two through-openings, in the base plate in relation to the solid part of the base plate, said ratio can be at least 40% and/or at least 45% and/or at most 55% and/or at most 50%. Expressed as a proportion of the at least one through-opening, for example two through-openings, in the base plate in relation to the total surface area thereof including the through-opening(s), a range of at least 20%, of at least 25% and/or of at most 50%, or of at most 45%, may be used.

In one embodiment of the packaging arrangement, the base plate protrudes beyond the separator plate stack at least in some regions at opposite ends of the separator plate stack in a first direction perpendicular to the stacking direction. Alternatively or additionally, the base plate can protrude beyond the separator plate stack at least in some regions at opposite ends of the separator plate stack in a second direction perpendicular to the stacking direction and perpendicular to the first direction. The advantage of this, among other things, is that the separator plate stack is better protected against mechanical damage.

The total surface area of the base plate, including the through-opening(s), can be, for example, at least 115% and/or at least 120% and/or at most 150% and/or at most 140% of the total surface area of a separator plate of the separator plate stack.

In one embodiment of the packaging arrangement, in each case the base plate can have a handle, or a structure for receiving a gripping tool, in two of the regions that protrude beyond the separator plate stack at opposite ends of the separator plate stack. This can make transportation simpler. For example, the packaging arrangement can thus be lifted and lowered in an automated manner. Whereas the aforementioned lifting and lowering device is used for lifting and lowering individual separator plates, or the separator plate stack formed therefrom, relative to the base plate, a gripping tool of this kind is thus used for example for lifting and lowering the entire packaging arrangement.

Alternatively, however, for example when using a suitable film, it is also possible to suction and thus lift the packaging arrangement by means of a vacuum gripper on the film in the region of the cover plate. Reference should also be made to the aforementioned option of gripping by means of strapping tapes.

In one embodiment of the packaging arrangement, the base plate can in each case comprise an indent in two of the regions protruding beyond the separator plate stack at opposite ends of the separator plate stack, such that the base plate protrudes beyond the separator plate stack in said regions but has a smaller width than in the corner regions. By way of example, the base plate can have a bone shape. The advantage of this may be, for example, that a gripping tool can grip the packaging arrangement without touching the separator plates. This can prevent damage to the separator plate stack caused by the gripping tool.

In one embodiment of the packaging arrangement, the separator plates are formed from metal sheets having a sheet thickness of at most 0.5 mm, of at most 0.2 mm, of at most 0.1 mm, of at most 0.09 mm, of at most 0.085 mm, of at most 0.08 mm, of at most 0.075 mm, of at most 0.07 mm, of at most 0.06 mm, or of at most 0.05 mm. For example, the separator plates may be single-layer separator plates having said sheet thickness or, alternatively, two- or three-layer separator plates in which a single layer has said sheet thickness.

The present disclosure further relates to a packaging system comprising a light-load carrier and at least two packaging arrangements as described above. The two packaging arrangements are received in the light-load carrier, the light-load carrier and the base plates of the packaging arrangements being dimensioned such that the base plates are received in the light-load carrier next to one another in a form-fitting or substantially form-fitting manner. The advantage of this is that the packaging arrangements can be prevented from slipping in the light-load carrier, or such slipping can at least be reduced. As a result, there is no need for any additional padding material. In the present case, the terms light-load carrier and small-load carrier are used synonymously. Small-load carriers or light-load carriers can for example be understood as a transportation and storage crate standardised by the German Automotive Industry Association (Verband der Automobilindustrie, VDA) as per VDA Recommendation 4500: Small-Load Carrier System (KLT).

The small-load carrier comprises plastics material, for example polypropylene. The small-load carrier may be made of plastics material, for example polypropylene. However, the small-load carriers may also comprise or be made of paper board. The small-load carriers may comprise a lid but may also be shrink-wrapped or sealed by stacking. Sealed KLTs are advantageous for example when tape bracing is used and the packaging arrangements are not packaged in film.

In one embodiment, the cut-outs for receiving the bolts in the base plate and, where applicable, in the cover plate can be arranged non-point-symmetrically. This may be advantageous for receiving an optimised number of packaging arrangements in one KLT while simultaneously adhering to any specified weight limits per packaging arrangement or any specified limits on separator plates arranged in said packaging arrangement. The bolt ends facing away from the base plate can project beyond the cover plate or separator plate stack. The underside of the base plate can have a corresponding orifice. By means of this, said projecting length can be received in the orifice on the underside of a further base plate arranged on the first separator plate stack or on the packaging arrangement, or of a further packaging arrangement arranged thereon. This can lead to improved stackability and/or fewer space issues. For example, the ribbing on the underside of the base plate can be formed such that a tip of a bolt can be received. If the base plate and cover plate are formed point-symmetrically (apart from the arrangement of the cut-outs for receiving the bolts), then this arrangement allows the packaging arrangements to be alternately arranged in a manner rotated by 180° using common parts for the base plate and cover plate, without needing any more space in the stacking direction in order to do so.

The present disclosure further relates to a method for packaging separator plates for an electrochemical system, for example packaging to form an above-described packaging arrangement. The proposed method comprises the steps of:

stacking a multiplicity of separator plates for an electrochemical system on a base plate in such a way that at least one bolt secured to the base plate is received in first cut-outs of the stacked separator plates, said cut-outs being aligned in a stacking direction.

The stacking of the separator plates on the base plate can comprise stacking the separator plates on a lifting and lowering device, which reaches through a through-opening in the base plate and is movable in the stacking direction, and lowering the lifting and lowering device.

The method may further comprise:

arranging a cover plate on the separator plate stack in such a way that the separator plate stack is arranged between the base plate and the cover plate in the stacking direction, for example in a manner secured by means of bolts, and enclosing or encircling the base plate, the separator plate stack and the cover plate using a flexible film or at least one tape that wraps around the separator plate stack between the base plate and the cover plate.

The features described above in relation to the packaging arrangement or packaging system can be applied similarly to the method.

Example embodiments will be illustrated and explained in more detail on the basis of the accompanying drawings and the following description of the drawings. The feature combinations described and shown in the drawings are merely examples and should not be construed as limiting.

DETAILED DESCRIPTION

Figure 1:
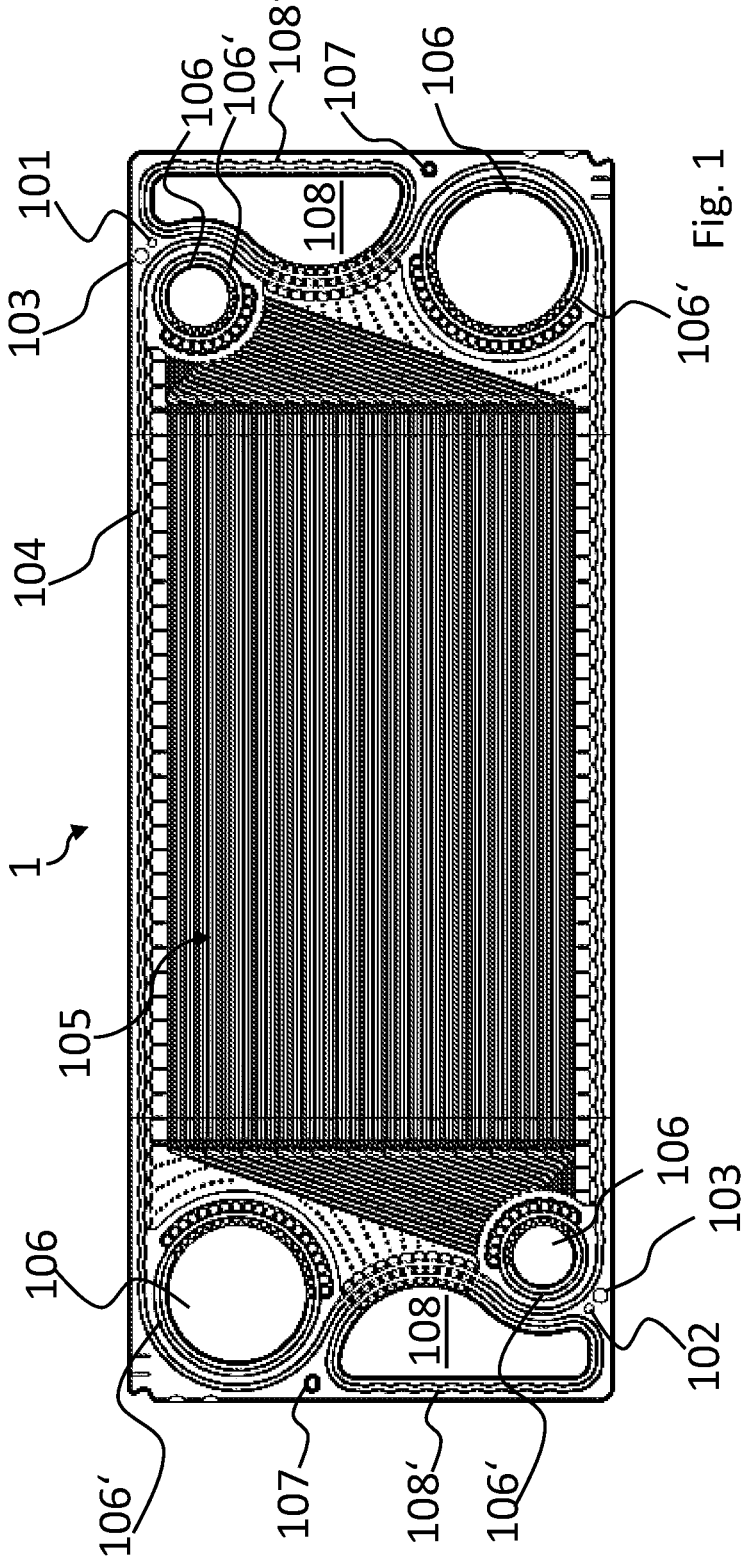
FIG. 1 is a plan view of a separator plate for an electrochemical system.

Features that occur more than once are provided with the same reference numerals in the drawings.

FIG. 1 is a plan view of a separator plate 1 for an electrochemical system, for example for a fuel cell. In the present case, the separator plate 1 is formed from sheet metal having a sheet thickness of 0.075 mm. The separator plate 1 has a cut-out 101 for receiving a first bolt. The separator plate 1 furthermore has a cut-out 102 for receiving a second bolt. In the fuel cell, separator plates according to FIG. 1 are stacked one on top of the other, a membrane electrode assembly (MEA) being arranged between the separator plates. The cut-outs 101 and 102 are arranged such that they are at least partly covered in the fuel cell by an MEA reinforcement edge, which usually consists of polymer-based film material. Furthermore, the separator plate 1 has two orifices 103 that are used for stacking the fuel cell, e.g. for stacking separator plates 1 and MEAs (not shown here) in alternation. In the fuel cell, the orifices 103 are not covered, or at least are not entirely covered, by the MEA reinforcement edge. The separator plate 1 has an active region 105 delimited by an encircling, integrally closed sealing arrangement 104. In the region delimited by the sealing arrangement 104, orifices 106 used for conducting media are also arranged in addition to the active region 105 and further fluid-conducting regions. The orifices 106 each have a respective further integrally closed sealing arrangement 106' extending around each orifice 106. The cut-outs 101 and 102 and the orifices 103 are arranged outside the region surrounded by the sealing arrangement 104, and thus also outside the active region. Embossings 107 for positioning the separator plates relative to one another, for example for a welding process or another connection process, are additionally provided on the separator plate. The orifices 108 are used for supplying and removing coolant and are each surrounded by their own sealing arrangement 108' outside the sealing arrangement 104.

Figures 2A, 2B:
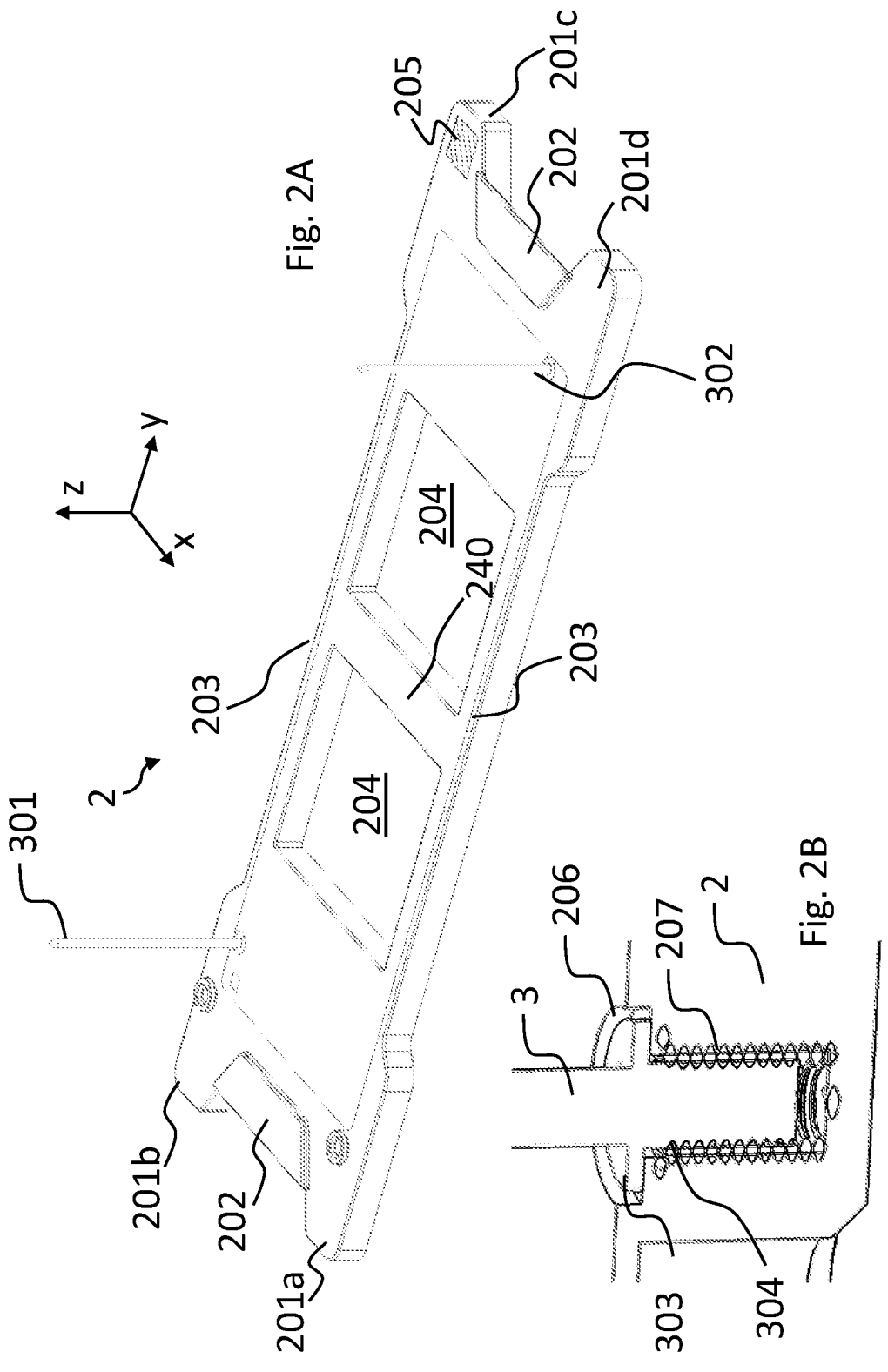
FIG. 2A is a perspective view of a base plate having a first screwed-in bolt and a second screwed-in bolt.
FIG. 2B is a sectional view of a detail of the base plate of FIG. 2A in the region of the first screwed-in bolt.

FIG. 2A is a perspective view of a base plate 2 having two screwed-in bolts 3. The base plate 2 is made of plastics material, for example comprises polypropylene. The screwed-in bolts 3 include a first bolt 301 and a second bolt 302. The bolts 301, 302 extend transversely to a surface of the base plate 2 in the z-direction whereas the surface of the base plate extends in the xy plane. The first bolt 301 and the second bolt 302 have a round cross section. At their top ends, the first bolt 301 and the second bolt 302 each have an upwardly tapering cross section. The base plate 2 is formed such that it protrudes beyond a separator plate that is stacked on the base plate and formed in accordance with the separator plate 1 of FIG. 1. If the separator plate 1 is stacked on the base plate 2, the first bolt 301 protrudes through the first cut-out 101 of the separator plate, and the second bolt 302 protrudes through the second cut-out 102. In each case, the base plate 2 has a handle 202 at both its longitudinal ends, which is offset inwards compared with corner regions 201a and 201b and corner regions 201c and 201d of the base plate. Thus, the handles 202 can be gripped when the base plate, or the packaging arrangement containing the base plate, is arranged in a small-load carrier (KLT), even if the corner regions 201a to 201d abut a wall of the KLT. The base plate 2 has opposite inset regions 203 in the longitudinal direction (y-direction) too. The regions 203 protrude beyond a separator plate stack formed from a multiplicity of separator plates 1 formed in accordance with FIG. 1. However, the regions 203 are set back inwards compared with outer edges of the corner regions 201a and 201d, and 201b and 201c. The base plate 2 has two central, substantially square openings 204, through which a lifting and lowering device can protrude in order to stack the separator plates 1 on the base plate or to remove them from the base plate or from the separator plate 1 therebelow. The two openings 204 are separated by a bar 240. Advantageously, the openings 204 are arranged such that they do not coincide with through-openings provided in the separator plates, for example do not coincide with media-conducting ports, when projected onto the separator plates 1. Thus, the base plate can protect the port edges against deformation. In addition, a code 205, for example in the form of a QR code, for storing associated data and/or for identifying stacked separator plates is attached in the corner region 201c on the surface of the base plate.

Using exactly two bolts 301 and 302 is advantageous since, in this way, fixing can be achieved in which both translatory movements of the separator plates transversely to the stacking direction and rotation of the separator plates about a straight line running in parallel with the stacking direction are blocked. It is possible to use more than two bolts, but it may be disadvantageous since it can lead to a statically overdetermined system and thus to stresses in the stacked separator plates or the base plate 2 and/or the cover plate 4.

As regards the ratio of the two through-openings 204 in the base plate in relation to the solid part of the base plate 2, said ratio can be at least 40% and/or at least 45% and/or at most 55% and/or at most 50%; in the present case it is 48%. Expressed as a proportion of the two through-openings 204 in the base plate 2 in relation to the total surface area thereof including the through-openings 204, a range of at least 20%, of at least 25% and/or at most 50%, of at most 45%, may be used.

FIG. 2B is a sectional view of a detail of the base plate 2 of FIG. 2A comprising a screwed-in bolt 3. For each bolt, the base plate 2 comprises a bore 206 having a single step. The bore 206 is a blind hole. The lower part of the bore 206 forms an internal thread 207. At its bottom end, the bolt 3 has an external thread 304. A collar 303 is formed at the top end of the external thread 304. The external thread 304 is screwed into the internal thread 207.

Figure 3A:
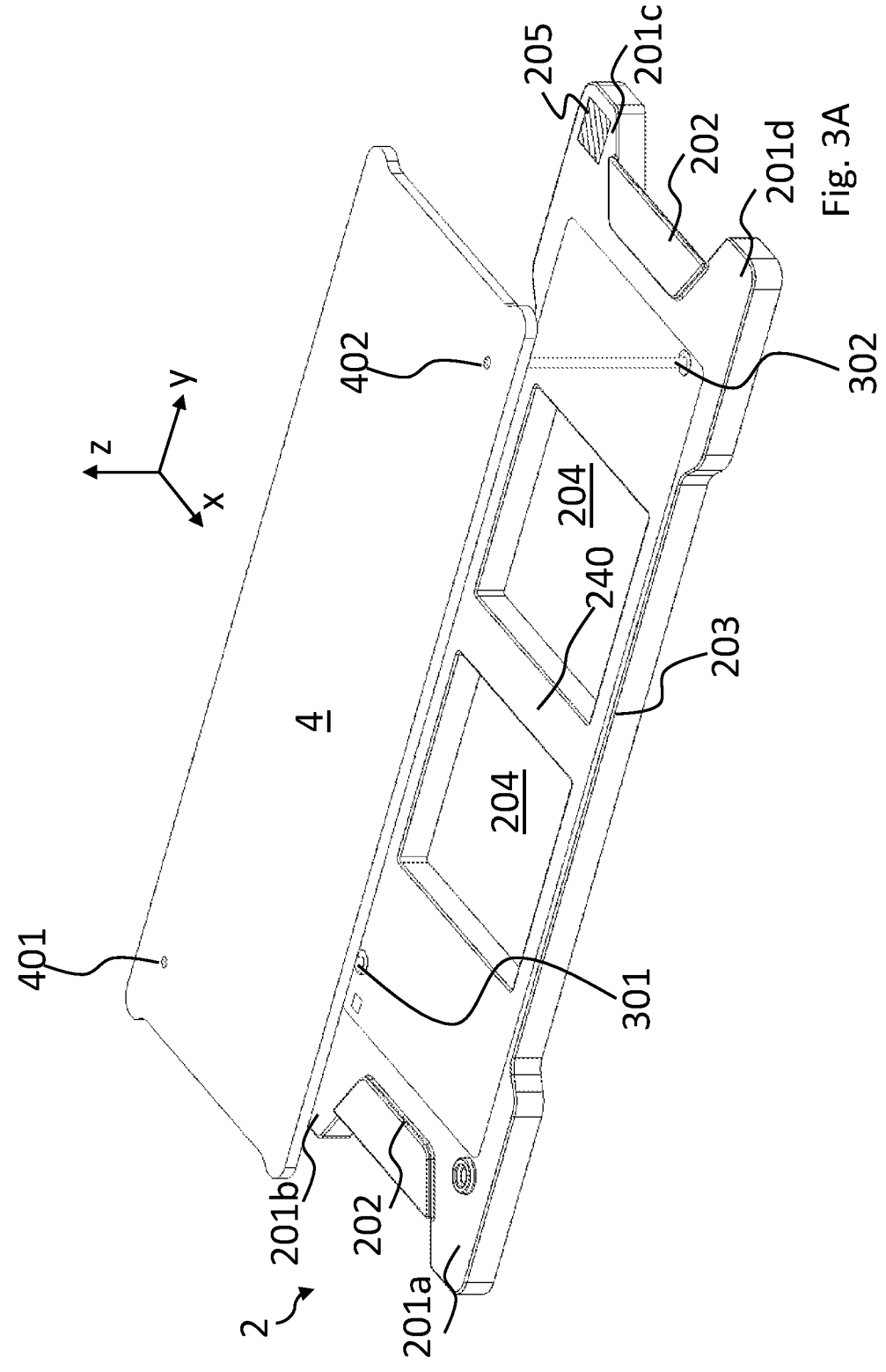
FIG. 3A is a perspective view of the base plate having the screwed-in bolts according to FIG. 2A, with a cover plate additionally being arranged on the bolts.

FIG. 3A shows the base plate 2 comprising the screwed-in bolts 3 of FIG. 2A and a cover plate 4 additionally mounted thereon. The cover plate is an injection-moulded part and made of polypropylene. The cover plate 4 has a first orifice 401 and a second orifice 402. The diameter of the first orifice 401 corresponds to the diameter of the first bolt 301. The diameter of the second orifice 402 corresponds to the diameter of the second bolt 302. A top end of the first bolt 301 protrudes into the first orifice 401, and a top end of the second bolt 302 protrudes into the second orifice 402, such that the lid is fixed in position in relation to the base plate in both the x-direction and the y-direction.

Figure 3B:
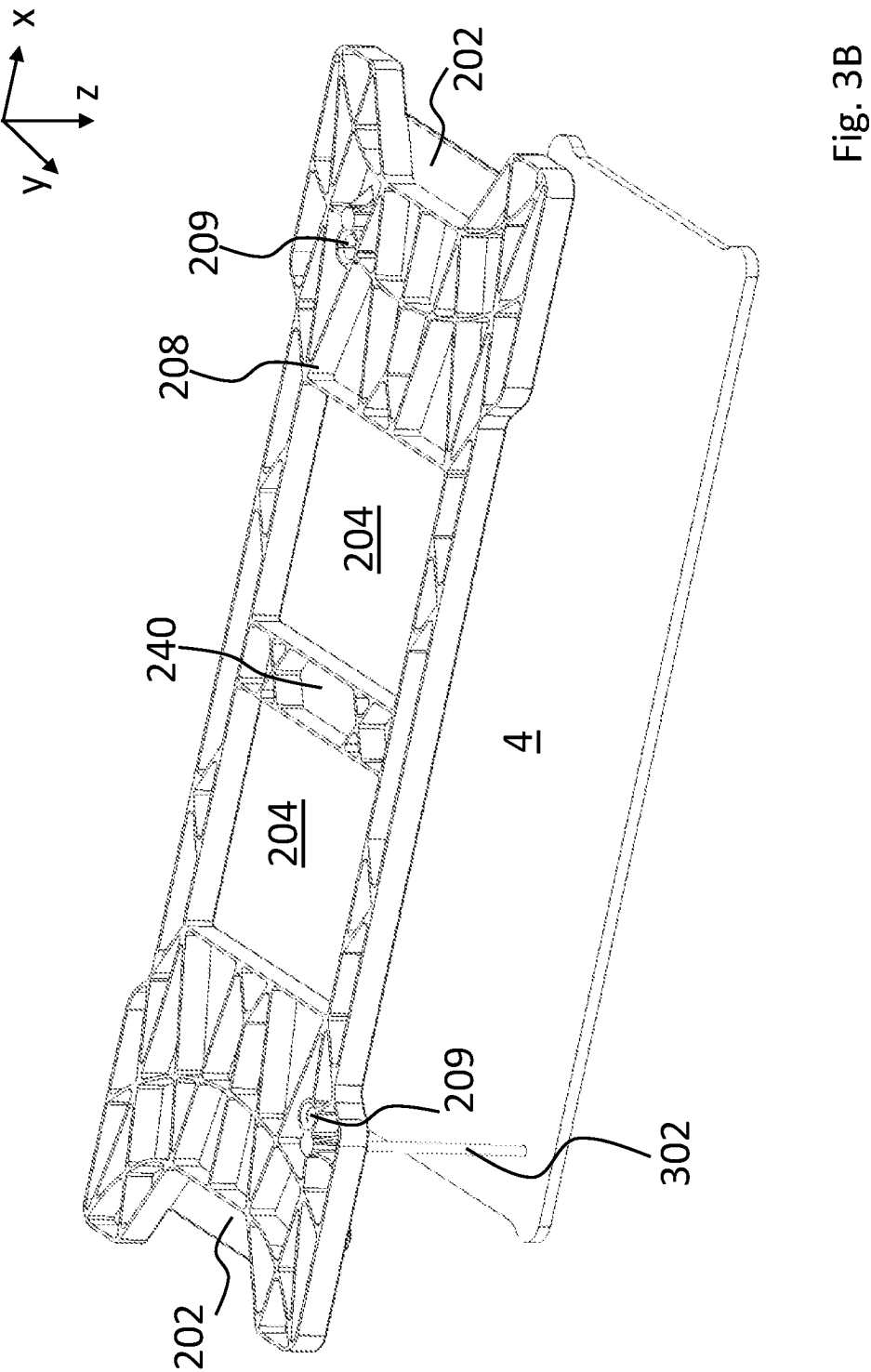
FIG. 3B is a perspective view of the base plate shown in FIG. 3A comprising the screwed-in bolts and the cover plate, from a further perspective.

FIG. 3B is a further perspective view from below the base plate 2 comprising the screwed-in bolts 3 and cover plate 4. The base plate 2 is configured to be hollow from below and has reinforcement ribs 208. In addition, orientation holes 209 are arranged next to the bores 206 for receiving the bolts 3. On the basis of the orientation holes 209, the base plate can be oriented in a machine, for example in a lifting and lowering device, in an automated manner.

Figure 4A:
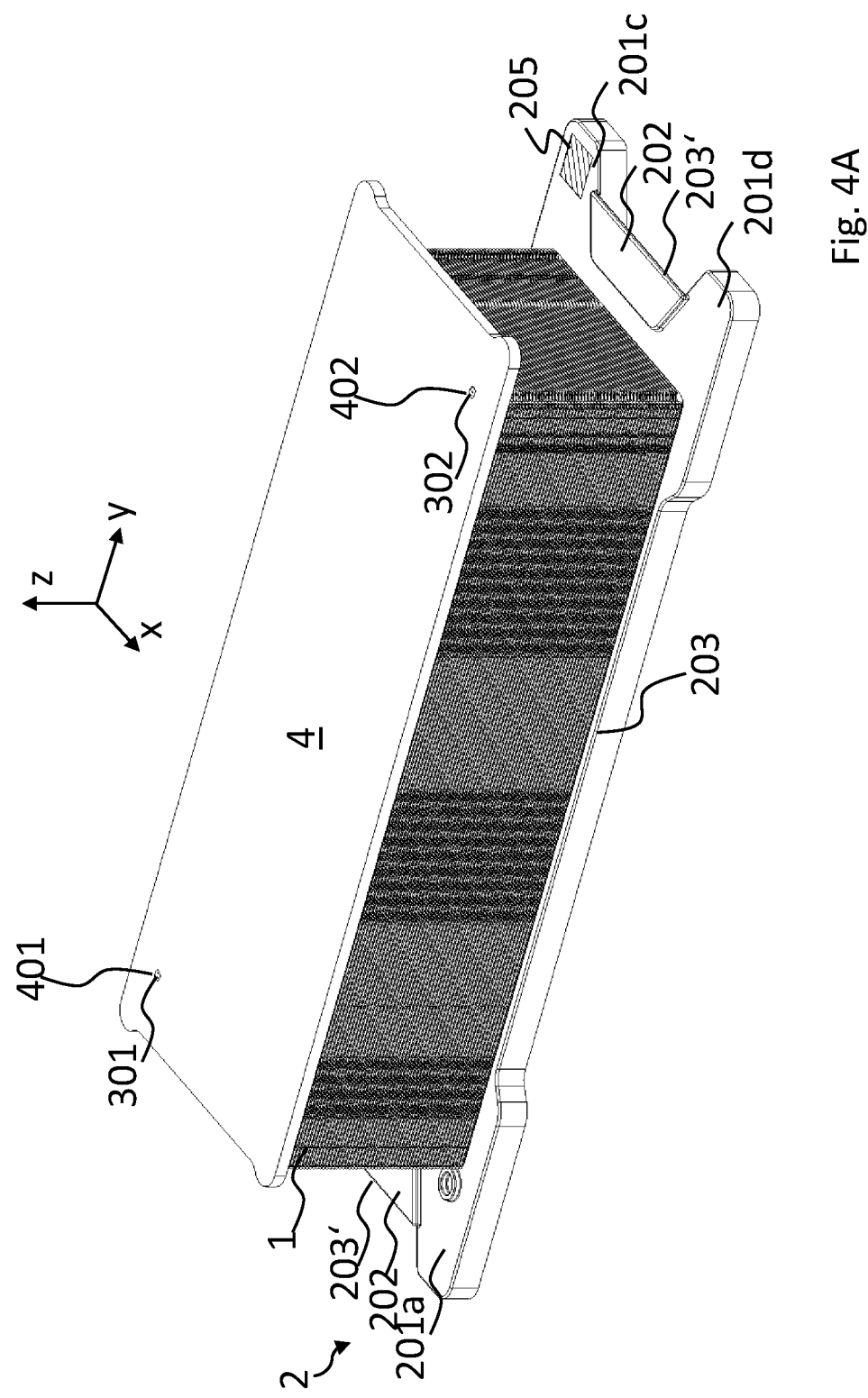
FIG. 4A is a perspective view of a packaging arrangement, comprising the base plate having the screwed-in bolts and cover plate of the previous figures as well as a separator plate stack arranged between the cover plate and the base plate.

FIG. 4A shows a packaging arrangement according to FIGS. 3A and 3B in the form of the base plate 2 comprising the screwed-in bolts 3 and the cover plate 4, having a multiplicity (75 in the present case) of separator plates 1. The separator plates 1 correspond to that in FIG. 1. The separator plates 1 are stacked between the base plate 2 and the cover plate 4 to form a separator plate stack. The cover plate 4 protrudes beyond the separator plate stack on both sides in the width direction (x-direction) and in the longitudinal direction (y-direction). The base plate 2 protrudes beyond the separator plate stack on both sides in the width direction (x-direction) and in the longitudinal direction (y-direction). A length, e.g. an extent in the y-direction, of the cover plate 4 corresponds to or is slightly less than the length of the base plate 2 in the region 203'. A gripping tool can thus grip the arrangement shown in FIG. 4A without touching the separator plates 1. The bolts 301 and 302 protrude through the cut-outs 101 and 102 and fix the separator plates 1 in position in relation to the base plate 2 in both the x-direction and y-direction. The top ends of the bolts 301 and 302 are inserted into the cut-outs 401 and 402, respectively, of the cover plate 4. The cover plate 4 is thus fixed in position in relation to the base plate 2 in both the x-direction and y-direction.

The total surface area of the base plate 2, including the through-openings 204, can be at least 115% and/or at least 120% and/or at most 150% and/or at most 140% of the total surface area of a separator plate 1 of the separator plate stack. In the example shown, the total surface area of the base plate 2 is 136% of the total surface area of a separator plate 1 of the separator plate stack.

Figure 4B:
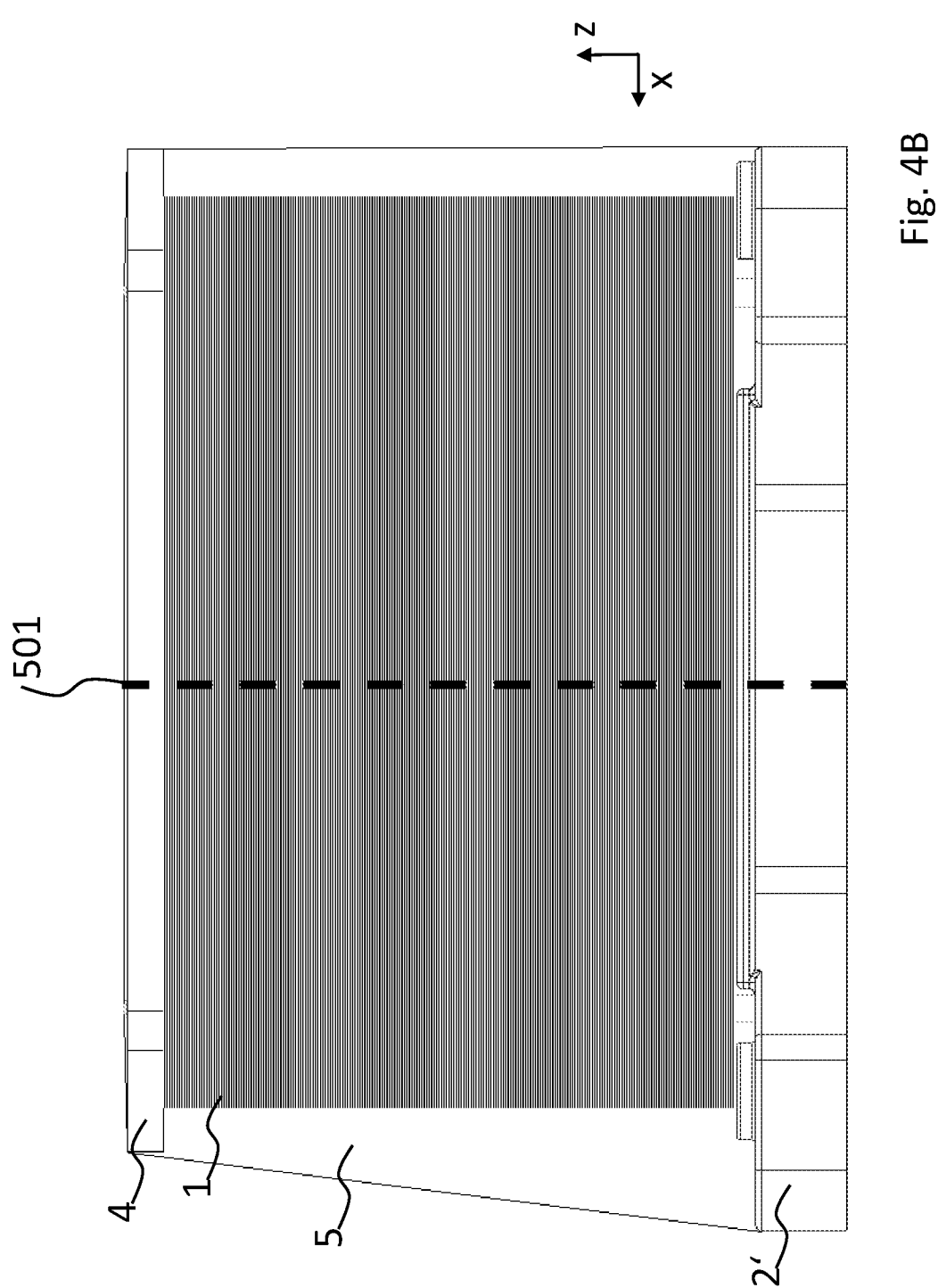
FIG. 4B is a side view of the packaging arrangement according to FIG. 4A, further comprising a film.

FIG. 4B shows the packaging arrangement shown in FIG. 4A together with a film 5. The film 5 is formed as shrink film and braces the separator plates 1 between the base plate 2 and the cover plate 4 in the z-direction. The film 5 can enclose the base plate 2, the cover plate 4 and the separator plates 1 arranged therebetween merely to provide protection against dirt or water. A tear strip 501 is provided in the film for opening it. The base plate 2' shown in FIG. 4B differs from the base plate 2 of the previous figures on account of an asymmetric formation, the base plate 2' being longer in the x-direction to the left of the tear strip 501 than to the right of the tear strip 501.

Figure 4C:
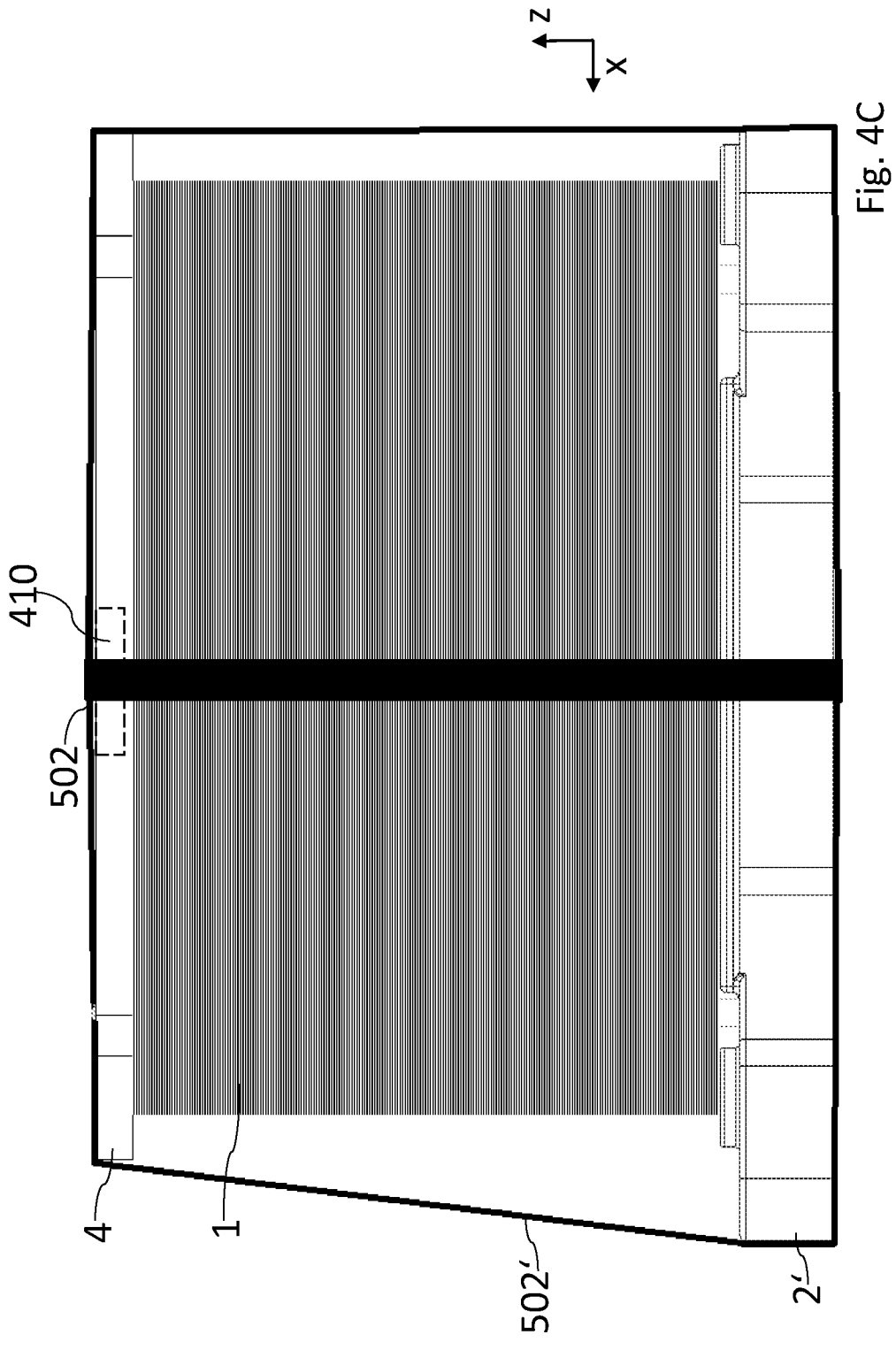
FIG. 4C is a side view of the packaging arrangement according to FIG. 4A, further comprising two tapes.

FIG. 4C shows a variant of the packaging arrangement shown in FIG. 4B, comprising two tapes 502, 502', which form strapping of the packaging arrangement and brace the separator plates 1 between the base plate 2 and the cover plate 4 in the z-direction. It may be sufficient to provide exactly one strapping tape 502 or 502' in order to prevent linear and rotational movements of the separator plates or at least limit them to a permitted level. FIG. 4C does not show an optionally present film, or other protective packaging, that protects the separator plate stack against dirt and can likewise be firmly held by one or by both of the tapes 502, 502'. In this embodiment example, the cover plate 4 has a centrally arranged recess 410, which allows the packaging arrangement to be gripped, for example at the centroid or at the crossing point of the tapes 502, 502', as an alternative gripping method for gripping the side edges of the base plate 2.

Figures 5A, 5B:
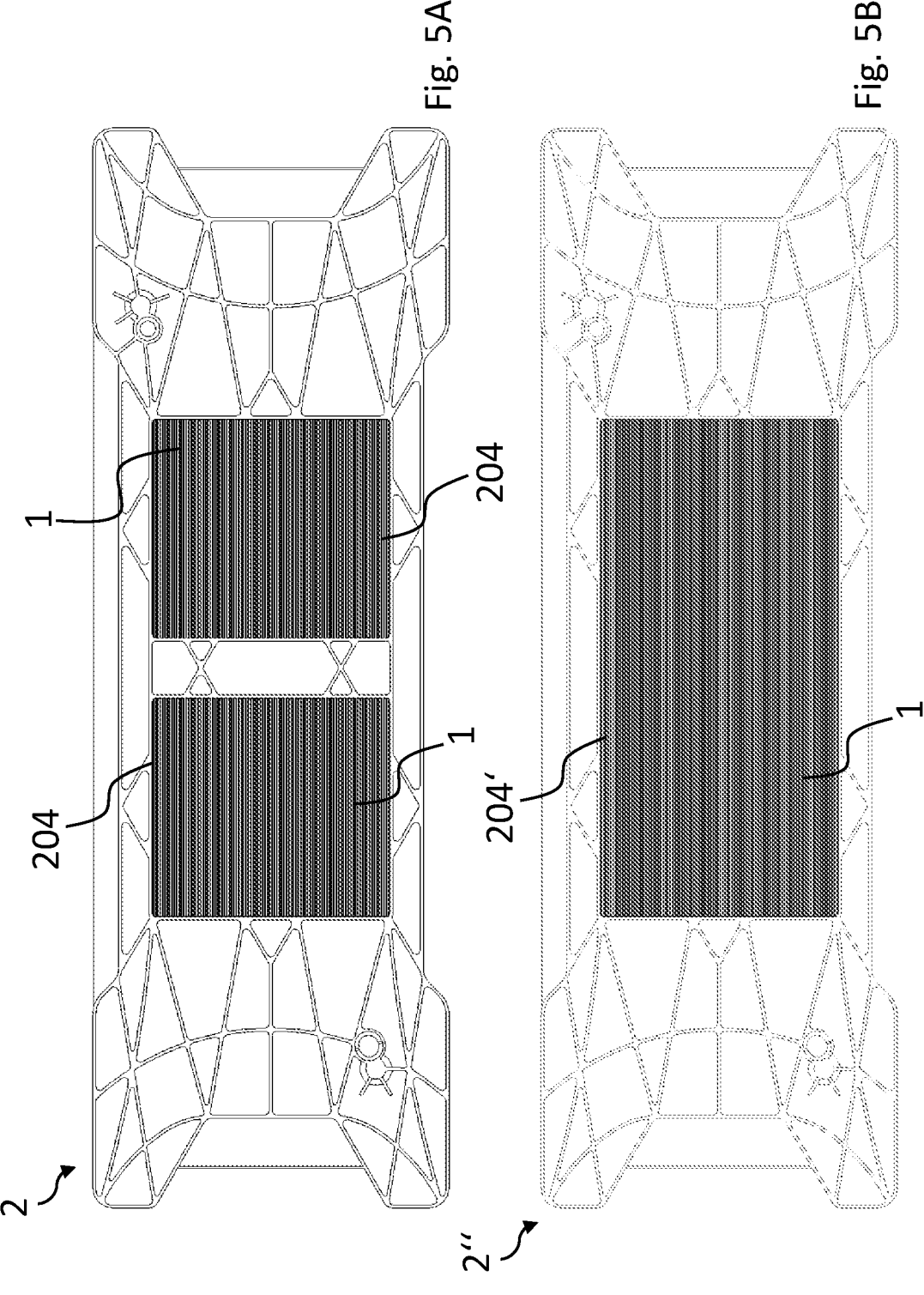
FIG. 5A is a view from below the packaging arrangement according to FIGS. 4A and 4B.
FIG. 5B is a view from below an alternative embodiment of a base plate that can be provided in the packaging arrangement of FIGS. 4A, 4B and 4C instead of the base plate of the previous figures.

FIG. 5A is a view from below the packaging arrangement of FIG. 4A. The active region of the lowermost stacked separator plate 1 can be seen through the openings 204. FIG. 5B is a view from below the packaging arrangement of FIG. 4A having an alternatively designed base plate 2". Instead of two smaller openings, the base plate 2" has one large opening 204' for receiving a lifting and lowering device. The active region of the lowermost stacked separator plate 1 can be seen through the opening 204'. Under real operating conditions, however, a separation element, for example a separation paper, may be arranged between the base plate 2 and the lowermost separator plate 1 of the separator plate stack. The separation elements merely serve to separate the separator plates. Membrane electrode assemblies or other elements arranged between the separator plates in a functional fuel cell stack should typically not be construed as separation elements. The same applies to corresponding functional components of other electrochemical systems.

Figure 6:
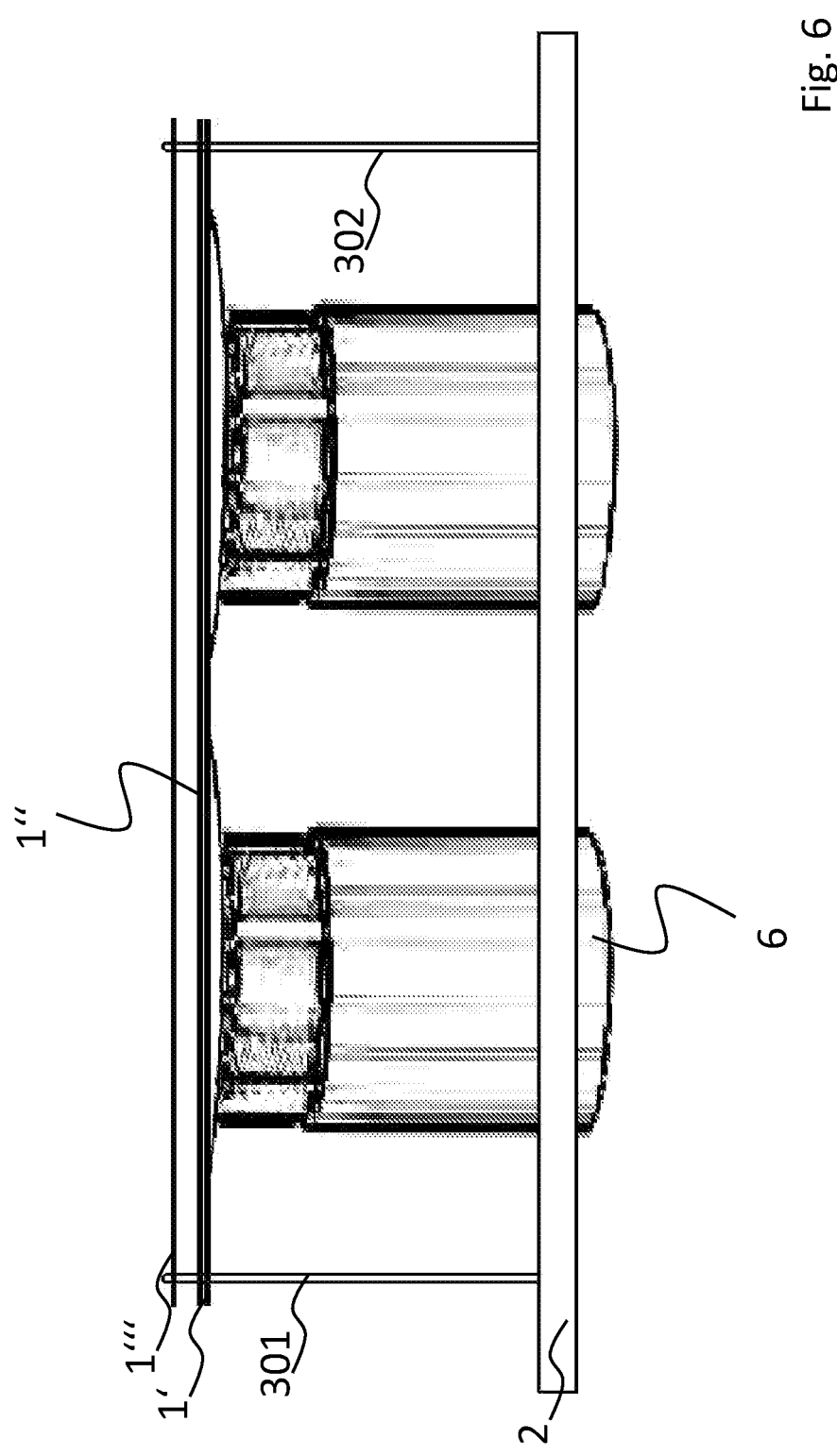
FIG. 6 is a side view of a stacking device.

FIG. 6 shows a moment in a stacking process during which a third separator plate 1''' is stacked on a base plate 2. A first separator plate 1' and a second separator plate 1'' have already been stacked. A lifting and lowering device 6 in the form of two hydraulic cylinders protrudes through the openings 204 in the base plate 2 according to one of the previous figures. The separator plates 1, the base plate 2 and the bolts 301 and 302 are formed as described in relation to the previous figures. Once a further separator plate 1 has been received, the lifting and lowering device is lowered so that a further separator plate can be received at an unvarying height of the packaging arrangement. In this way, a multiplicity of separator plates 1 are successively stacked onto the base plate 2 one on top of the other in an automated manner. A separation element can be arranged between each separator plate. In this case, the separation element may be parchment paper. The separation elements are merely used to separate the separator plates. Membrane electrode assemblies or other elements arranged between the separator plates in a functional fuel cell stack or a stack of another electrochemical system should typically not be construed as separation elements. Once the last separator plate of the separator plate stack formed in this way has been stacked, the cover plate 4 is stacked in accordance with the above figures. Next, the packaging arrangement thus formed is wrapped in a film 5, which is shrunk on so that the film 5 braces the separator plate stack between the base plate 2 and the cover plate 4.

Figure 7:
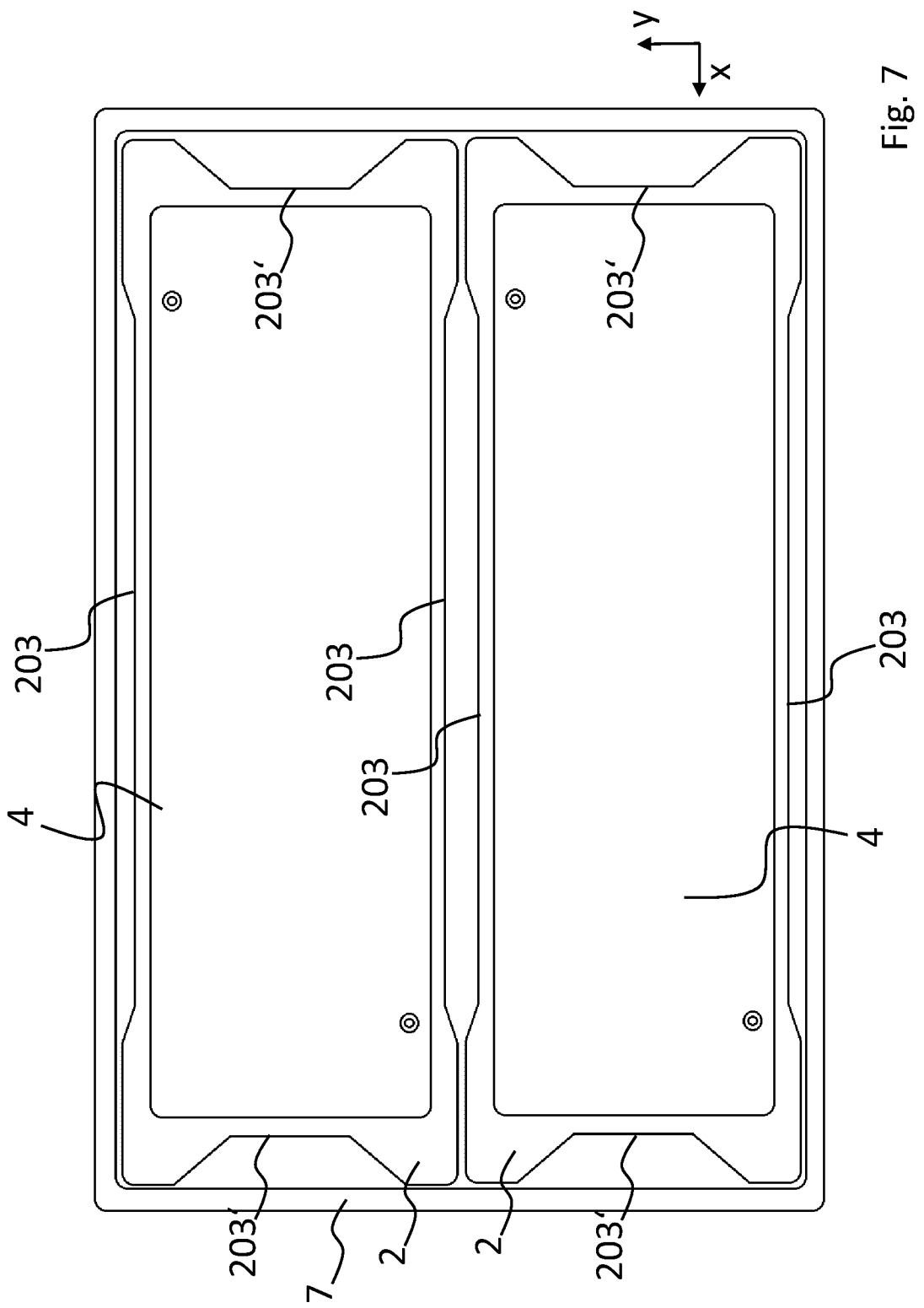
FIG. 7 is a plan view of a light-load carrier having two received packaging arrangements according to FIG. 4B.

FIG. 7 is a plan view of two packaging arrangements according to the previous figures arranged next to one another in a light-load carrier 7. The base plates 2 of the packaging arrangements are dimensioned such that they are received in the light-load carrier 7 in a form-fitting manner. Setback regions 203 and 203' on opposite sides of the base plates 2 do not abut the side walls of the KLT 7, and so the packaging arrangement can be removed from the KLT in an automated manner using a gripping tool. The packaging arrangements can be directly protected from dirt by means of film, but it is also possible to enclose or seal the KLT in its entirety or at least on its top side using a film. In addition, protection against dirt can be provided by means of a reusable lid of the KLT.

Figure 8A:
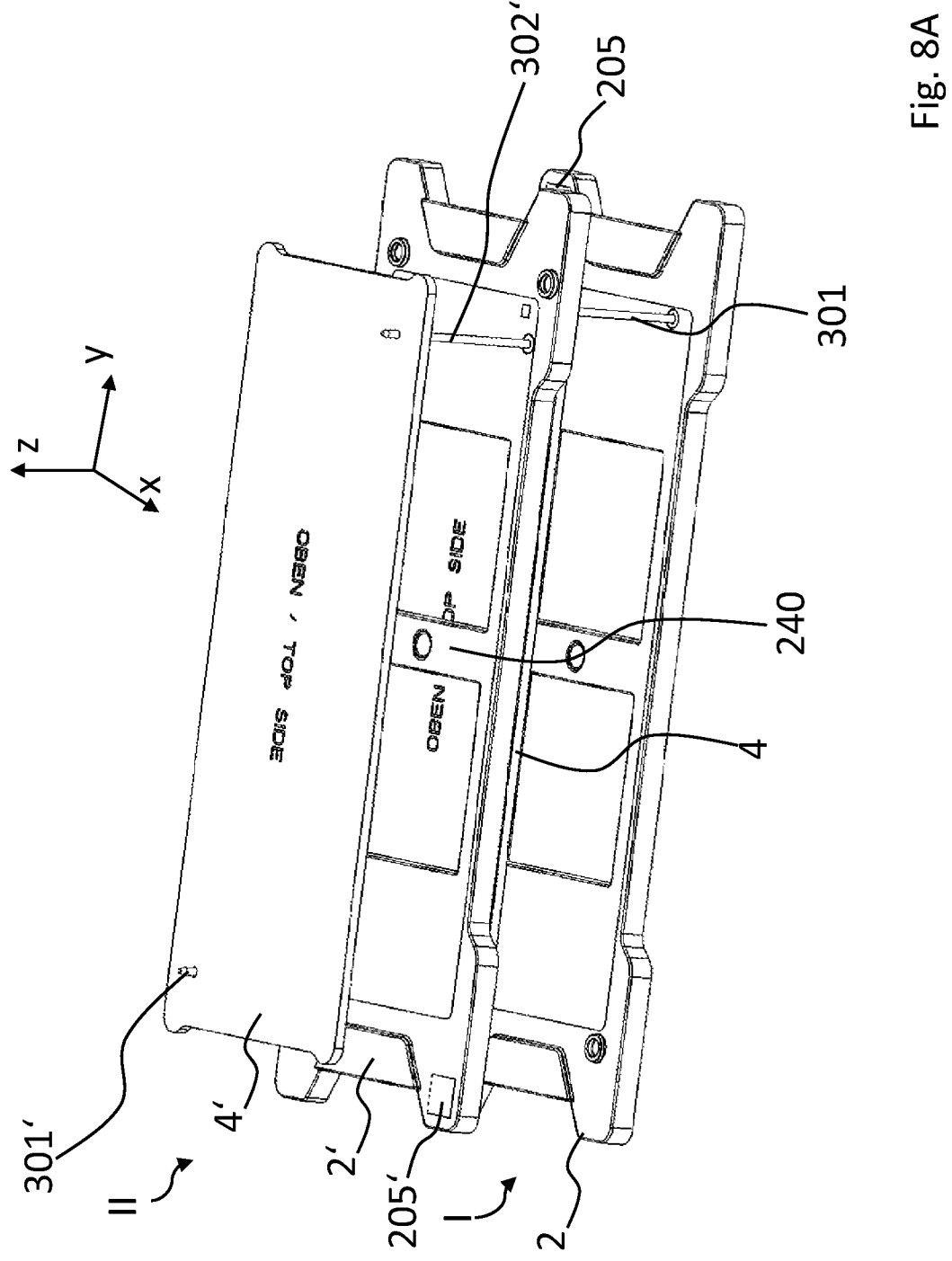
FIG. 8A is a perspective view of an assembled module comprising the base plate having the screwed-bolts and cover plate according to FIG. 3A, with a further such module additionally being stacked.
Figure 8B:
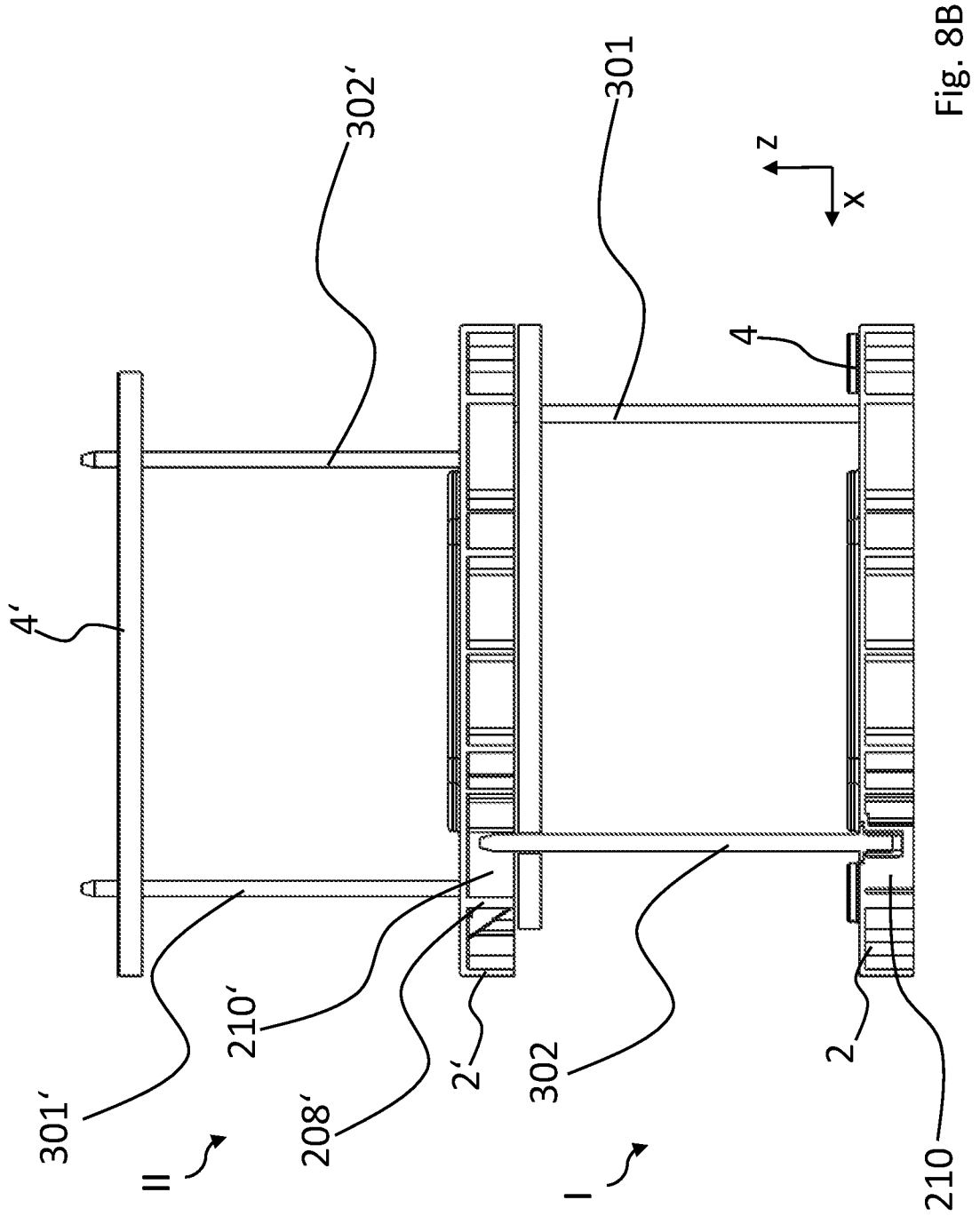
FIG. 8B is a sectional view through FIG. 8A, the section running in a plane parallel to the xz plane.

FIG. 8A is a perspective view of an assembled module I comprising a base plate 2 having screwed-in bolts 3 and a cover plate 4. As regards the shaping of the base plate 2, bolts 3 and cover plate 4, reference should be made to the explanations regarding the above figures. A further such module II, likewise comprising a base plate 2' having screwed-in bolts 3' and a cover plate 4', is stacked on the module I. The construction of the stacked module II substantially corresponds to the construction of the lower module I, which is described by way of example above in relation to FIG. 3A. FIG. 8B is a sectional view through the stacked modules I and II shown in FIG. 8A. The section runs through the bolt 302 and in parallel with the xz plane.

The lower module I is rotated relative to the upper module II by 180° about the centre of the bar 240, as is also clear from the position of the respective codes 205, 205'. As a result, the bolts 301' and 302' are arranged offset from the bolts 302 and 301, and so they do not collide when the modules are stacked. Orifices 210' are provided on an underside of the base plate 2' of the stacked module, into which orifices the top ends of the bolts 301 and 302 protrude. For example, the orifices 210' can be cut-outs between reinforcement ribs 208' on the underside of the base plate 2'. The base plate 2 can additionally have orifices 210 into which the top ends of bolts 301' and 302' can be inserted. Thus, any number of modules I and II can be stacked one on top of the other, the top ends of the respective bolts 301/302 and 301'/302' each being insertable into respective orifices 210' and 210. The figures are drawn to scale, although other relative dimensions may be used if desired.

The present disclosure further comprises the following aspects.

A packaging arrangement comprising a base plate, at least one first bolt (301) secured to the base plate (2) and a multiplicity of separator plates (1) for an electrochemical system, which are stacked on the base plate (2) in a stacking direction so as to form a separator plate stack, wherein the first bolt (301) is received in first cut-outs (101) of the stacked separator plates (1), said first cut-outs being aligned in the stacking direction.

The packaging arrangement according to aspect 1, comprising at least one second bolt (302) secured to the base plate (2), wherein the second bolt (302) is received in second cut-outs (102) of the stacked separator plates (1), said second cut-outs being aligned in the stacking direction.

The packaging arrangement according to aspect 2, wherein the first bolt (301) and the second bolt (302) fix the separator plate stack in position relative to the base plate (2) in a first direction perpendicular to the stacking direction and in a second direction perpendicular to the stacking direction and perpendicular to the first direction.

The packaging arrangement according to aspect 2 or aspect 3, wherein the separator plates (1) have a rectangular or substantially rectangular shape perpendicularly to the stacking direction, wherein the first cut-outs (101) and the second cut-outs (102) of the separator plates (1) are formed in diagonally opposing corner regions of the separator plates.

The packaging arrangement according to any of the preceding aspects, comprising a cover plate (4), wherein the separator plate stack is arranged between the base plate (2) and the cover plate (4) in the stacking direction.

The packaging arrangement according to any of aspects 2 to 4 and according to aspect 5, wherein the cover plate (4) has a first cut-out (401), which is aligned with the first cut-outs (101) of the separator plates (1) in the stacking direction, and wherein the cover plate (4) has at least one second cut-out (402), which is aligned with the second cut-outs (102) of the separator plates (1) in the stacking direction, wherein the first bolt (301) is additionally received in the first cut-out (401) of the cover plate (4) and wherein the second bolt (302) is additionally received in the second cut-out (402) of the cover plate (4).

The packaging arrangement according to any of the preceding aspects, wherein corner regions (201a, 201b, 202c, 201d) of the base plate (2) protrude beyond corner regions of the separator plate stack and/or corner regions of the cover plate (4) protrude beyond corner regions of the separator plate stack.

The packaging arrangement according to any of aspects 5 to 7, comprising a flexible film (5) which encloses the base plate (2), the separator plate stack and the cover plate (4) at least in some regions.

The packaging arrangement according to any of aspects 5 to 8, comprising at least one tape (502, 502') which encircles, for example encloses, the base plate (2), the cover plate (4) and the separator plate stack at least in some regions.

The packaging arrangement according to any of the two preceding claims, wherein the flexible film (5) and/or the at least one tape (502, 502') restrains the separator plate stack between the base plate (2) and the cover plate (4) in the stacking direction.

The packaging arrangement according to any of aspects 8 to 10, wherein the flexible film (5) is formed as shrink film.

The packaging arrangement according to any of aspects 10 and 11, comprising a tear strip, integrated in the flexible film (5), for opening and/or removing the flexible film (5).

The packaging arrangement according to any of the preceding aspects, wherein the first and/or the second cut-outs (101, 102) of the separator plates (1) are formed as through-holes spaced apart from edges of the separator plates (1).

The packaging arrangement according to any of the preceding aspects, wherein the separator plates (1) each have an active region having structures for conducting media along a planar face of the separator plate (1) and an integrally closed sealing arrangement (104), encircling the active region, for sealing the active region, wherein the first cut-outs (101) and/or the second cut-outs (102) of the separator plates (1) are each arranged outside the sealing arrangement (104).

The packaging arrangement according to any of the preceding aspects, wherein the separator plates (1) each have an active region having structures for conducting media along a planar face of the separator plate (1) and an integrally closed sealing arrangement (104), encircling the active region, for sealing the active region, wherein the base plate (2) has at least one through-opening (204) arranged such that a projection of the through-opening (204) onto the separator plates (1) in the stacking direction coincides with the active regions of the separator plates (1) at least in some regions.

The packaging arrangement according to any of the preceding aspects, wherein the base plate (2) protrudes beyond the separator plate stack at least in some regions at opposite ends of the separator plate stack in a first direction perpendicular to the stacking direction, and wherein the base plate (2) protrudes beyond the separator plate stack at least in some regions at opposite ends of the separator plate stack in a second direction perpendicular to the stacking direction and perpendicular to the first direction.

The packaging arrangement according to aspect 16, wherein in each case the base plate (2) has a handle (202), or a structure for receiving a gripping tool, in two of the regions that protrude beyond the separator plate stack at opposite ends of the separator plate stack.

The packaging arrangement according to any of the preceding aspects, wherein the separator plates (1) are formed from metal sheets having a sheet thickness of at most 0.5 mm, at most 0.2 mm, at most 0.1 mm, at most 0.075 mm and for example at most 0.05 mm.

A packaging system comprising a light-load carrier (7) and at least two packaging arrangements according to any of the preceding aspects, which are received in the light-load carrier (7), wherein the light-load carrier (7) and the base plates (2) of the packaging arrangements are dimensioned such that the base plates (2) are received in the light-load carrier (7) next to one another in a form-fitting or substantially form-fitting manner.

Method for packaging separator plates for an electrochemical system, for example to form a packaging arrangement according to any of aspects 1 to 18, the method comprising the steps of:

stacking a multiplicity of separator plates (1) for an electrochemical system on a base plate (2) in such a way that at least one bolt (301) secured to the base plate (2) is received in cut-outs (101) of the stacked separator plates (1), said cut-outs being aligned in a stacking direction.

Method according to aspect 20, wherein the stacking of the separator plates (1) on the base plate (2) comprises stacking the separator plates (1) on a lifting and lowering device (6), which reaches through a through-opening (204) in the base plate (2) and is movable in the stacking direction, and lowering the lifting and lowering device (6).

Method according to aspect 20 or aspect 21, further comprising:

arranging a cover plate (4) on the separator plate stack in such a way that the separator plate stack is arranged between the base plate (2) and the cover plate (4) in the stacking direction, and enclosing or encircling the base plate (2), the separator plate stack and the cover plate (4) using a flexible film (5) or at least one tape (502, 502') that restrains the separator plate stack between the base plate (2) and the cover plate (4).

The invention claimed is:

1. A packaging arrangement comprising a base plate, at least one first bolt secured to the base plate and a multiplicity of separator plates for an electrochemical system, which are stacked on the base plate in a stacking direction so as to form a separator plate stack, wherein the first bolt is received in first cut-outs of the stacked separator plates, said first cut-outs being aligned in the stacking direction.

2. The packaging arrangement according to claim 1, comprising at least one second bolt secured to the base plate, wherein the second bolt is received in second cut-outs of the stacked separator plates, said second cut-outs being aligned in the stacking direction.

3. The packaging arrangement according to claim 2, wherein the first bolt and the second bolt fix the separator plate stack in position relative to the base plate in a first direction perpendicular to the stacking direction and in a second direction perpendicular to the stacking direction and perpendicular to the first direction.

4. The packaging arrangement according to claim 2, wherein the separator plates have a rectangular or substantially rectangular shape perpendicularly to the stacking direction, wherein the first cut-outs and the second cut-outs of the separator plates are formed in diagonally opposing corner regions of the separator plates.

5. The packaging arrangement according to claim 2, comprising a cover plate, wherein the separator plate stack is arranged between the base plate and the cover plate in the stacking direction.

6. The packaging arrangement according to claim 5, wherein the cover plate has a first cut-out, which is aligned with the first cut-outs of the separator plates in the stacking direction, and wherein the cover plate has at least one second cut-out, which is aligned with the second cut-outs of the separator plates in the stacking direction, wherein the first bolt is additionally received in the first cut-out of the cover plate and wherein the second bolt is additionally received in the second cut-out of the cover plate.

7. The packaging arrangement according to claim 5, comprising a flexible film which encloses the base plate, the separator plate stack and the cover plate at least in some regions.

8. The packaging arrangement according to claim 7, wherein the flexible film is formed as shrink film.

9. The packaging arrangement according to claim 7, comprising a tear strip, integrated in the flexible film, for opening and/or removing the flexible film.

10. The packaging arrangement according to claim 5, comprising at least one tape which encircles the base plate, the cover plate and the separator plate stack at least in some regions.

11. The packaging arrangement according to claim 1, wherein the first and/or the second cut-outs of the separator plates are formed as through-holes spaced apart from edges of the separator plates.

12. The packaging arrangement according to claim 1, wherein corner regions of the base plate protrude beyond corner regions of the separator plate stack and/or corner regions of the cover plate protrude beyond corner regions of the separator plate stack.

13. The packaging arrangement according to claim 1, wherein the separator plates each have an active region having structures for conducting media along a planar face of the separator plate and an integrally closed sealing arrangement, encircling the active region, for sealing the active region, wherein the first cut-outs and/or the second cut-outs of the separator plates are each arranged outside the sealing arrangement.

14. The packaging arrangement according to claim 1, wherein the separator plates each have an active region having structures for conducting media along a planar face of the separator plate and an integrally closed sealing arrangement, encircling the active region, for sealing the active region, wherein the base plate has at least one through-opening arranged such that a projection of the through-opening onto the separator plates in the stacking direction coincides with the active regions of the separator plates at least in some regions.

15. The packaging arrangement according to claim 1, wherein the base plate protrudes beyond the separator plate stack at least in some regions at opposite ends of the separator plate stack in a first direction perpendicular to the stacking direction, and wherein the base plate protrudes beyond the separator plate stack at least in some regions at opposite ends of the separator plate stack in a second direction perpendicular to the stacking direction and perpendicular to the first direction.

16. The packaging arrangement according to claim 15, wherein in each case the base plate has a handle, or a structure for receiving a gripping tool, in two of the regions that protrude beyond the separator plate stack at opposite ends of the separator plate stack.

17. The packaging arrangement according to claim 1, wherein the separator plates are formed from metal sheets having a sheet thickness of at most 0.5 mm.

18. A packaging system comprising a light-load carrier and at least two the packaging arrangements according to claim 1, which are received in the light-load carrier, wherein the light-load carrier and the base plates of the packaging arrangements are dimensioned such that the base plates are received in the light-load carrier next to one another in a form-fitting or substantially form-fitting manner.

19. A method for packaging separator plates for an electrochemical system, for example to form the packaging arrangement according to claim 1, the method comprising the steps of:

stacking a multiplicity of separator plates for an electrochemical system on a base plate in such a way that at least one bolt secured to the base plate is received in cut-outs of the stacked separator plates, said cut-outs being aligned in a stacking direction.

20. The method according to claim 19, wherein the stacking of the separator plates on the base plate comprises stacking the separator plates on a lifting and lowering device, which reaches through a through-opening in the base plate and is movable in the stacking direction, and lowering the lifting and lowering device or the method further comprising:

arranging a cover plate on the separator plate stack in such a way that the separator plate stack is arranged between the base plate and the cover plate in the stacking direction, and enclosing or encircling the base plate, the separator plate stack and the cover plate using a flexible film or at least one tape that restrains the separator plate stack between the base plate and the cover plate.

* * * * *